United States Patent [19]

Kogane et al.

[11] Patent Number: 4,576,471
[45] Date of Patent: Mar. 18, 1986

[54] PHOTOGRAPHIC PRINTING APPARATUS

[75] Inventors: Mikio Kogane; Mizuho Nishimura, both of Kanagawa, Japan

[73] Assignee: Fuji Photo Film Co., Ltd., Kanagawa, Japan

[21] Appl. No.: 718,055

[22] Filed: Mar. 29, 1985

[30] Foreign Application Priority Data

Mar. 30, 1984 [JP] Japan .................................. 59-64803

[51] Int. Cl.⁴ ........................ G03B 27/48; G03B 27/50
[52] U.S. Cl. ....................................... 355/50; 355/55; 355/64; 355/75
[58] Field of Search ....................... 355/40, 46, 50, 55, 355/63, 64, 75, 76

[56] References Cited

U.S. PATENT DOCUMENTS 3,511,565 5/1970 Harman, Jr. et al. ............. 355/64 X
3,689,149 9/1972 Livingood ........................ 355/64 X Primary Examiner—Richard A. Wintercorn
Attorney, Agent, or Firm—Sughrue, Mion, Zinn, Macpeak and Seas

[57] ABSTRACT

A photographic printing apparatus is capable of effecting printing on photographic paper from various types of negative film including a negative film of continuous length by replacing a negative film carrier with another. When the negative film carrier is at its printing position, a light receiver opposes the printing light axis, and only an optical system is moved vertically to cope with a change in magnification during a printing operation. At the time of retraction of the negative film carrier, the light receiver is raised together with the optical system, thereby facilitating the replacement of the negative film carrier.

21 Claims, 9 Drawing Figures

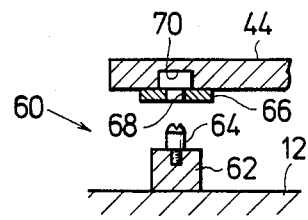
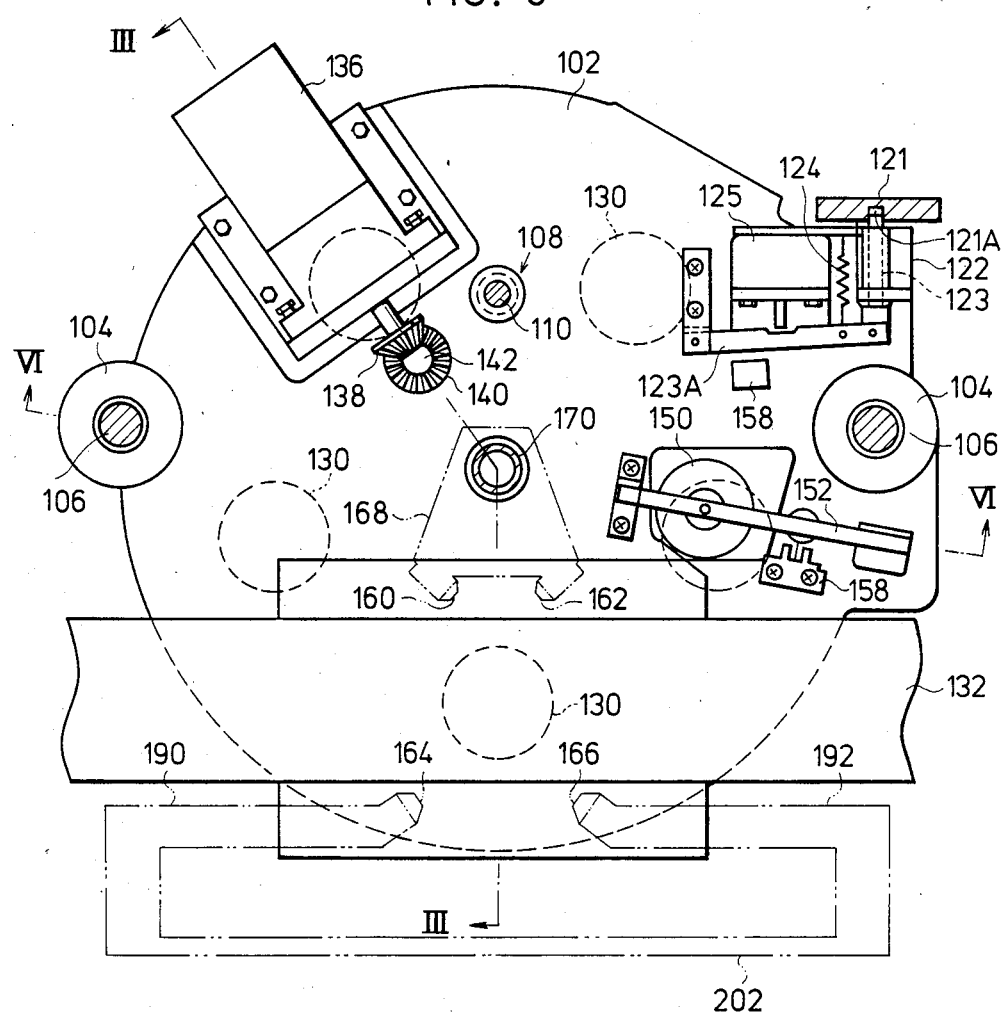

PHOTOGRAPHIC PRINTING APPARATUS

BACKGROUND OF THE INVENTION

1. Field of the Invention

The present invention relates to a photographic printing apparatus in which a negative film of continuous length is successively fed out and images thereon are printed on photographic paper.

2. Description of the Prior Art

A typical conventional photographic printing apparatus used to print a negative film of continuous length has hitherto been arranged such that the negative film previously wound on a supply unit is fed out to a take-up unit while passing through a negative film carrier, and images on the negative film passing over a printing gate aperture formed in the negative film carrier are sequentially printed on a roll of photographic paper.

The size of the printing gate aperture of the negative film carrier in the above-described photographic printing apparatus is generally determined in such a manner that the aperture can correspond to a negative film having images of full size (24×36 mm) or half size (18×24 mm), which is ½ of the full size. For this reason, when printing is to be effected from a negative film having images of a size which is different from the predetermined size of the printing gate aperture, it is disadvantageously necessary to remove the negative film carrier from the apparatus body and to mount another negative film carrier suitable for such a negative film.

In order to overcome such a disadvantage, a photographic printing apparatus having a negative film carrier which is capable of corresponding to both full- and half-size images has heretofore been proposed (examples of this type of photographic printing apparatus include Japanese Patent Laid-Open No. 129029/1978).

However, when printing is to be effected from a negative film having images of a size which is different from the full or half size, or a negative film which is not of the continuous length type, it is still necessary in this photographic printing apparatus to remove the negative film carrier from the apparatus body and to mount a special negative film carrier. When negative film carriers are replaced one with another, it is necessary to separate the optical system and the light receiver for color correction from the negative film carrier in order to facilitate the replacing operation. In a printing operation, however, although the optical system may be moved for the purpose of adjusting the focal point, the light receiver needs to remain in its fixed state in order to maintain predetermined photometric conditions.

SUMMARY OF THE INVENTION

In view of the above-described facts, a primary object of the present invention is to provide a photographic printing apparatus in which, at the time of printing, it is possible to move only the optical system without moving the light receiver, and when the negative film carrier is replaced with another, it is possible to move the light receiver in a manner similar to that of the optical system.

To this end, according to the invention, there is provided a photographic printing apparatus in which the light receiver and the optical system are each independently movable by lifting means in a direction in which they separate from the negative film carrier, whereby, at the time of printing, it is possible to vertically move the optical system for the purpose of adjusting, for example, the focal length and to maintain the light receiver at its fixed position for the purpose of making uniform photometric conditions, and when the negative film carrier is replaced with another, it is possible to separate the light receiver from the negative film carrier in a manner similar to that of the optical system, thereby facilitating the replacement of the negative film carrier.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which:

FIG. 4 is an exploded sectional view of an essential portion of the embodiment shown in FIG. 3;

FIG. 5 is a sectional view taken along the line V—V of FIG. 1;

DESCRIPTION OF THE PREFERRED EMBODIMENT

Figure 1:
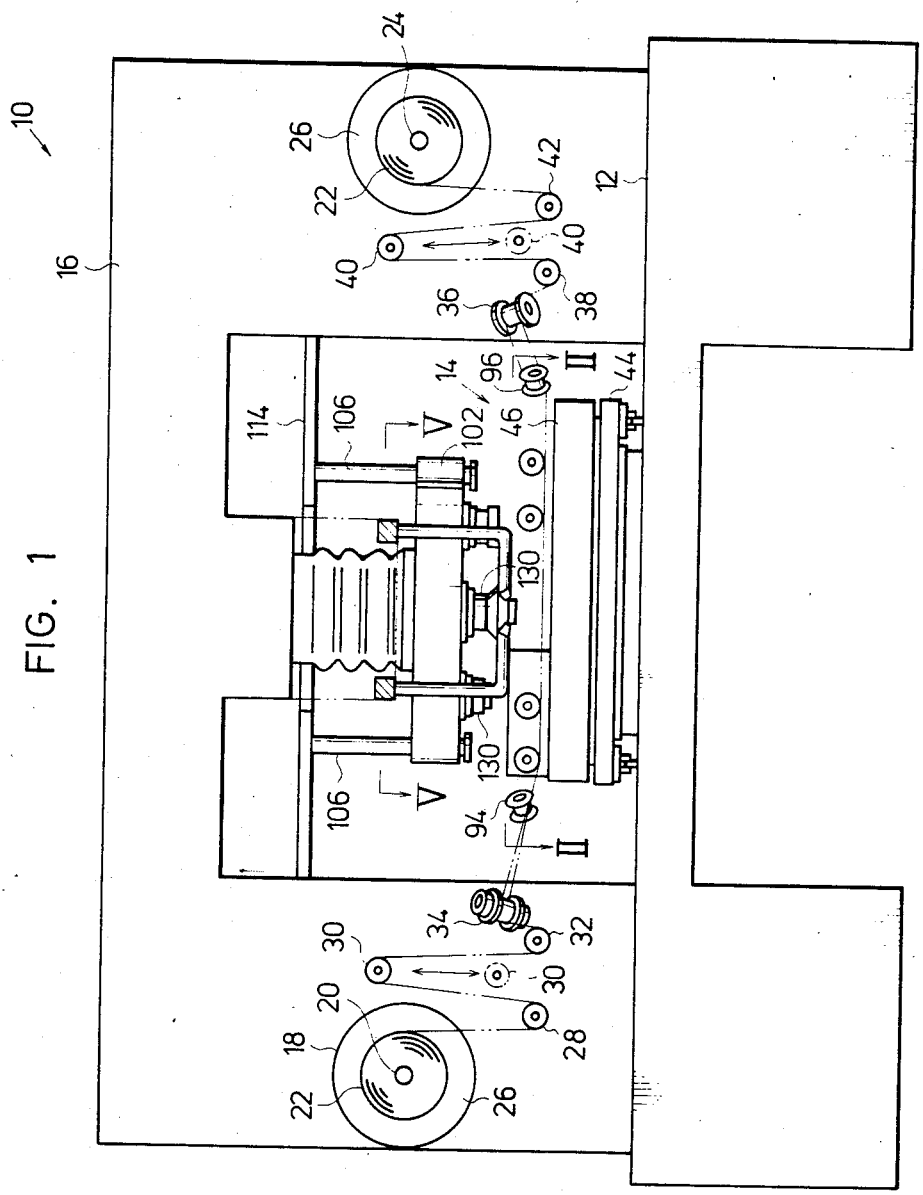
FIG. 1 is a front elevational view of one embodiment of the photographic printing apparatus according to the present invention.

FIG. 1 is a front elevational view of a photographic printing apparatus 10 in accordance with one embodiment of the present invention. A negative film carrier 14 is disposed in the center of a table 12. A frame 16 is secured to the table 12 in such a manner as to extend over the negative film carrier 14.

A supply reel 18 is rotatably supported on one of the sides of the frame 16 through a shaft 20. A negative film 22 of continuous length has previously been wound on the supply reel 18. The arrangement is such that the negative film 22 is passed through the negative film carrier 14 and is wound on a take-up reel 26 which is rotatably supported on the other side of the frame 16 through a shaft 24.

A guide roller 28, a tension roller 30, a guide roller 32 and a course changing roller 34 are rotatably supported on the frame 16 between the supply reel 18 and the negative film carrier 14. The negative film 22 is successively passed over these rollers before reaching the negative film carrier 14. Further, a course changing roller 36, a guide roller 38, a tension roller 40 and a guide roller 42 are rotatably supported on the frame 16 between the negative film carrier 14 and the take-up reel 26. Thus, the negative film 22 fed out from the negative film carrier 14 is successively passed over these rollers and the thus guided film 22 is then wound up on the take-up reel 26.

Figure 2:
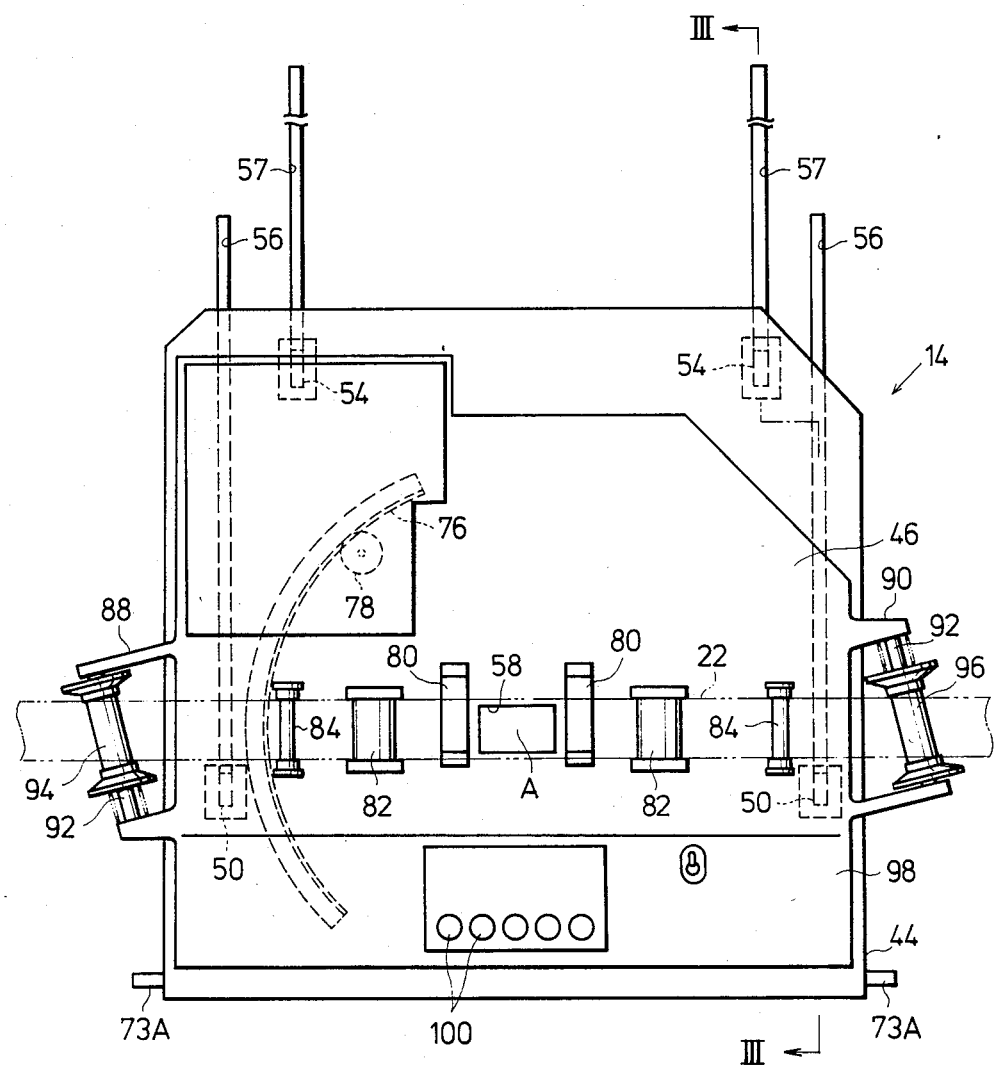
FIG. 2 is a sectional view tken along the line II—II of FIG. 1.
Figure 3:
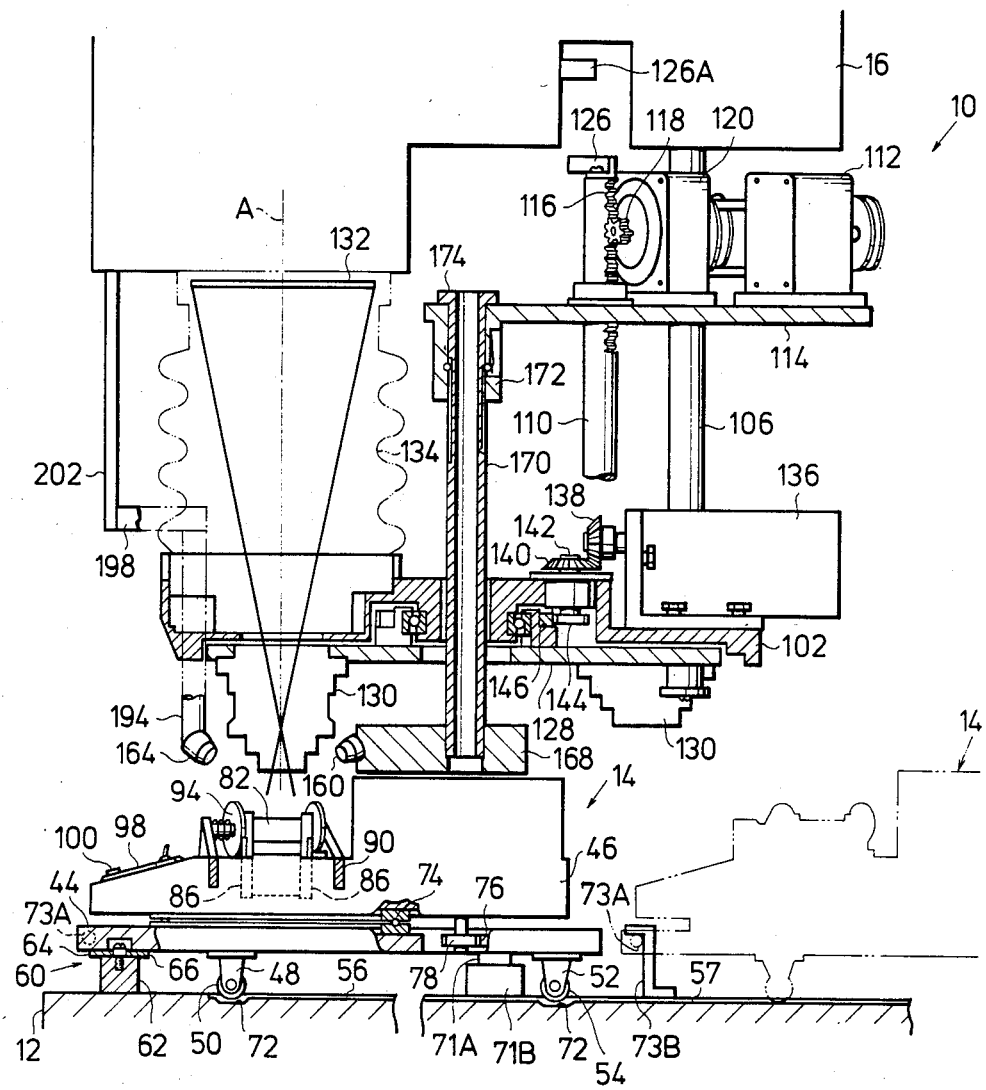
FIG. 3 is a sectional view taken along the line III—III of FIG. 2.

As shown in FIGS. 2 and 3 also, the negative film carrier 14 has such a structure that a carrier body 46 is disposed on a wheeled base 44. The wheeled base 44 has wheels 50 and 54 in pairs on its lower end portion. The wheels 50 are rotatably supported by respective brackets 48 on the front side of the wheeled base 44 (on the bottom side as viewed in FIG. 2; on the left-hand side as viewed in FIG. 3), while the wheels 54 are rotatably supported by respective brackets 52 on the rear side of the base 44. The wheels 50 and 54 are disposed such as to be offset from each other in the direction orthogonal to the traveling direction of the wheeled base 44 in the manner shown in FIG. 2 (that is, the corresponding wheels 50 and 54 are offset from each other in the lateral direction of the base 44 as shown in FIG. 2). The wheels 50 and 54 are disposed such as to respectively correspond to grooves 56 and 57 which are formed on the table 12. These grooves 56, 57 constitute guide grooves which permit the respective wheels 50, 54 partially entering the same to roll therein such as to guide the negative film carrier 14 in such a manner that it is capable of retracting from the position shown by the solid line in FIG. 3 to the position shown by the imaginary line.

When a printing operation is effected, the negative film carrier 14 is placed in the position shown by the solid line in FIG. 3. The arrangement is such that, when the negative film carrier 14 is in this printing position, a printing gate aperture 58 formed in the carrier body 46 is coincident with the axis A of the printing light. The imaginary line in FIG. 3 shows the negative film carrier 14 which has moved from the printing light axis A to its retraction position.

Positioning means 60 is provided on the front lower portion of the carrier body 46 in such a manner that the wheeled base 44 is reliably positioned and fixed at the printing position.

This positioning means 60 is arranged as shown in FIG. 4. More specifically, a positioning pin 64 is screwed into a block 62 which is secured to the table 12. The positioning pin 64 is adapted to correspond to a positioning bore 68 formed in a positioning plate 66 which is secured to the lower end portion of the wheeled base 44. Accordingly, if the wheeled base 44 is moved such that the positioning plate 66 comes directly above the positioning pin 64 and the base 44 is lowered in such a manner that the positioning pin 64 is tightly inserted into the positioning bore 68, then the movement of the wheeled base 44 in the radial direction of the positioning pin 64 (toward the right- or left-hand side as viewed in FIG. 3, that is, in the longitudinal direction of the base 44) is limited and is accurately positioned. On the reverse surface of the wheeled base 44 is formed a relief recess 70 for the purpose of receiving the head of the positioning pin 64.

When the wheeled base 44 is placed in the printing position in such a manner that the positioning plate 66 is located directly above the positioning pin 64, a projection 71A formed on the rear lower portion of the wheeled base 44 is mounted on a projection 71B which projects from the table 12 such as to support the rear lower portion of the wheeled base 44.

It is to be noted that recesses 72 are respectively formed in the grooves 56, 57 for the purpose of making the wheels 50, 54 separate from the respective bottom surfaces of the associated grooves 56, 57 when the wheeled base 44 is in its printing position so that the positioning of the wheeled base 44 in the vertical direction (toward the top or bottom as viewed in FIG. 3) is reliably effected in the state wherein the positioning plate 66 is mounted on the block 62.

Further, a plurality of pins 73A project horizontally from both sides of the wheeled base 44. The pins 73A are adapted to abut against corresponding hooks 73B which project from the rear portion of the table 12, thereby limiting the movement of the wheeled base 44 in its retracting direction. If necessary, the wheeled base 44 is screwed to the table 12 at this retracting position.

As shown in FIG. 3, the carrier body 46 is mounted on the wheeled base 44 through a plurality of guide balls 74. The guide balls 74 are disposed around the printing gate aperture 58 such that the carrier body 46 is rotatable 90° counterclockwise from the position illustrated in FIG. 2 about the printing gate aperture 58.

This rotation of the carrier body 46 is effected by means of a combination of a rack 76 and a pinion 78. The rack 76 is disposed on the wheeled base 44 such as to define about ¼ of a circle about the printing gate aperture 58. On the other hand, the pinion 78 is rotatably supported by the carrier body 46 in such a manner as to mesh with the rack 76. The pinion 78 is rotated by means of the driving force of a motor (not shown) which is mounted on the carrier body 46, whereby the carrier body 46 is rotated.

When the carrier body 46 is in the state illustrated in FIG. 2, a full-size image may be printed. To print a half-size image, the carrier body 46 is rotated 90° counterclockwise about the printing light axis A so that the printing gate aperture 58 matches a half-size image. More specifically, as the printing gate aperture 58 is rotated 90° from the state illustrated in FIG. 2, the shorter sides of the printing gate aperture 58 are coincident with the longer sides of each of the half-size images on the negative film 22. In this manner, it is possible for the printing gate aperture 58 to adapt to both full- and half-size images.

A guide plate 80, a guide roller 82 and a guide roller 84 are rotatably supported on the carrier body 46 on either sides of the printing gate aperture 58. The arrangement is such that the negative film 22 is guided by cooperation between the guide rollers 82 and guide rollers 86 (see FIG. 3) which are rotatably supported within the carrier body 46 in such a manner that the negative film 22 is passed over the printing gate aperture 58.

Further, a pair of brackets 88, 90 project from both lateral end portions of the carrier body 46 such as to rotatably support course changing rollers 94 and 96 through shafts 92, respectively. These course changing rollers 94, 96 are disposed in such a manner that their respective axes obliquely cross a horizontal line and also slightly obliquely cross the direction orthogonal to the longitudinal direction of the negative film 22 in the state illustrated in FIG. 2. By virtue of this arrangement, the negative film 22 can be reliably guided in such a manner that it advances while accurately defining a straight line between the course changing rollers 94, 96, whereby the negative film 22 is smoothly conveyed irrespective of whether the carrier body 46 is in the full-size image printing state shown in FIG. 2 or in the half-size image printing state wherein the carrier body 46 has been rotated 90° counterclockwise.

It is to be noted that a control panel 98 is disposed on the front side of the carrier body 46, and control means, such as color correction switches 100, are disposed on the control panel 98.

Figure 6:
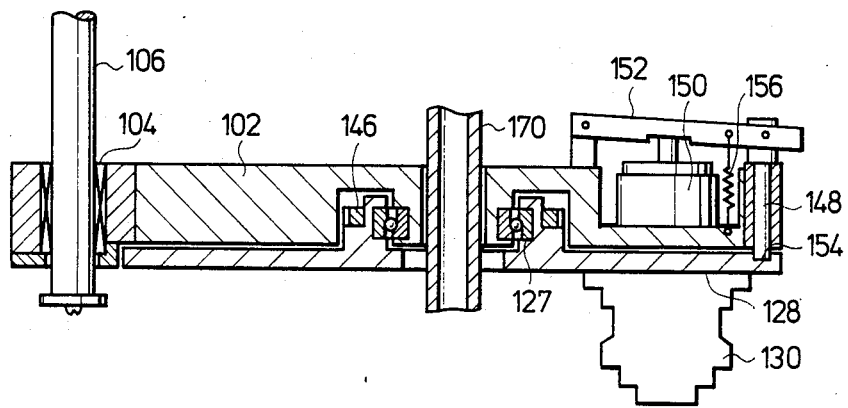
FIG. 6 is a sectional view taken along the line VI—VI of FIG. 5.

A lifting plate 102 is disposed above the negative film carrier 14 in the manner shown in FIG. 1. This lifting plate 102 has, as also shown in FIGS. 5 and 6, a plurality of bearings 104 mounted thereon in such a manner that their respective axes extend vertically. Guide posts 106 are respectively received by the bearings 104. The respective upper end portions of the guide posts 106 are secured to the frame 16. By this arrangement, it is possible for the lifting plate 102 to move vertically while being guided by the guide posts 106.

This vertical movement of the lifting plate 102 is effected in such a manner that a support shaft 110 which has its lower end portion secured to the lifting plate 102 through a ball joint 108 is actuated by means of the driving force of a motor 112 in the manner shown in FIG. 3. More specifically, the support shaft 110 is received by a motor bracket 114 which projects from the frame 16 such that the upper end portion of the support shaft 110 projects beyond the upper surface of the motor bracket 114. The support shaft 110 has a rack 116 formed at its upper end portion. The rack 116 is meshed with a pinion 118, which is in turn secured to the output shaft of a gear box 120 which incorporates a clutch. The gear box 120 is rotated by means of the driving force of the motor 112, whereby the support shaft 110 can vertically move the lifting plate 102 by means of the rotation of the pinion 118.

A guide bar 121 (see FIG. 5) stands on the frame 16. A plurality of positioning bores 121A are formed in the guide bar 121 at proper spacings such that the bores 121A selectively oppose a positioning pin 123 which is disposed on the lifting plate 102. The positioning pin 123 is guided by a bracket 122 in such a manner that the pin 123 is able to advance straight forward. The positioning pin 123 is guided by means of the biasing force of a tension coil spring 124 in a direction in which the pin 123 enters any of the positioning bores 121A. A solenoid 125 is mounted on the lifting plate 102. The solenoid 125 is excited when the lifting plate 102 is to be moved up and down in such a manner that the positioning pin 123 is removed from the positioning bore 121A through a lever 123A.

It is to be noted that a striker 126 is secured to the upper end portion of the support shaft 110 in such a manner as to oppose a photosensor 126A mounted on the frame 16. When the photosensor 126A detects the fact that the lifting plate 102 has reached its raised position, the drive of the motor 112 is suspended.

Referring next to FIG. 6, the lifting plate 102 has bearings 127 mounted in the center thereof in such a manner that their respective axes extend vertically. A rotating plate 128 is rotatably supported at the lower side of the lifting plate 102 through the bearings 127. A plurality of optical systems 130 are mounted on the lower end portion of the rotating plate 128 at proper spacings. Thus, the rotation of the rotating plate 128 allows these optical systems 130 to successively coincide with the printing light axis A. The optical systems 130 respectively incorporate lens assemblies, whereby it is possible to print images on photographic paper 132 at any desired rate of magnification by means of the light emitted from a light source (not shown) which is provided on the table 12.

This photographic paper 132 is what is called a roll type photographic paper which has both its longitudinal ends respectively wound on a supply reel and a take-up reel. Further, in order to protect the photographic paper 132 from undesirable exposure, a bellows 134 is provided such as to extend between the frame 16 and the lifting plate 102 in such a manner as to shut out any external light.

The rotation of the rotating plate 128 is effected by means of a motor 136 which is mounted on the lifting plate 102. The output shaft of the motor 136 is connected to a pinion shaft 142 through bevel gears 138 and 140. The pinion shaft 142 has a pinion 144 secured to the other end thereof. The pinion 144 is meshed with a rack 146 which is provided on the rotating plate 128. The rack 146 is formed in the shape of a ring around the central axis of the lifting plate 102. By this arrangement, it is possible for the rotating plate 128 to rotate about the axis of the lifting plate 102.

When the rotating plate 128 is rotated, it is accurately positioned by means of a positioning pin 148 in the manner shown in FIG. 6, whereby each of the optical systems 130 is made accurately coincident with the printing light axis A. The positioning pin 148 is supported by a shaft at the distal end of a lever 152 which is pivotal by means of the driving force of a solenoid 150. Thus, when the solenoid 150 is excited, the positioning pin 148 is removed from one of the positioning bores 154 into which it is inserted, the positioning bores 154 being formed in the rotating plate 128 at proper spacings; when the solenoid 150 is de-energized, the positioning pin 148 is inserted into another positioning bore 154 by means of the biasing force of a tension coil spring 156, whereby positioning is effected. It is to be noted that the operating condition of the lever 152 is detected by means of a photosensor 158 in the manner shown in FIG. 5.

Figure 8:
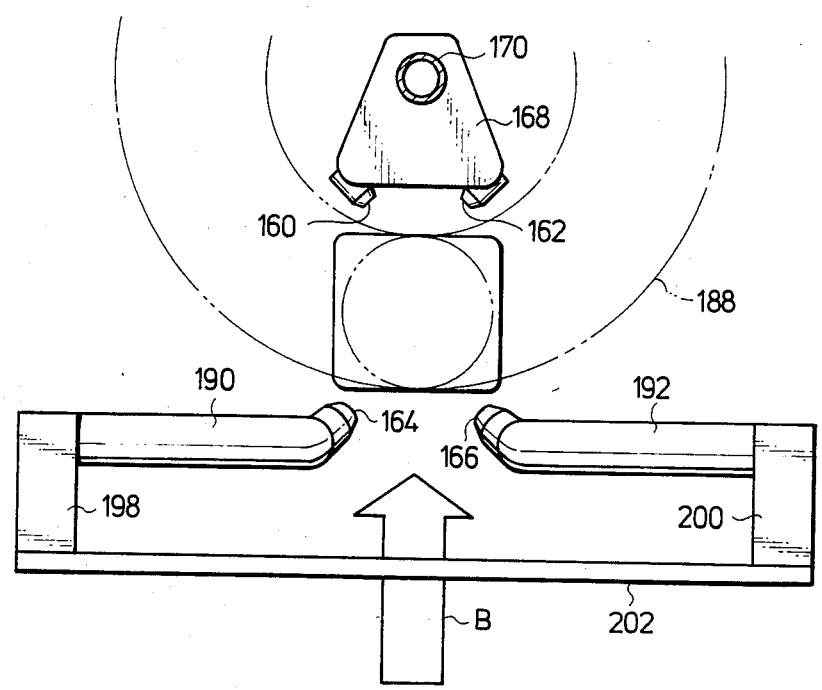
FIG. 8 is a plan view of light receivers and the rotational locus of optical systems employed in the embodiment.

Referring now to FIG. 8, inner light receivers 160, 162 and outer light receivers 164, 166 are disposed on the printing light axis A. Each of these light receivers incorporates sensors for respectively detecting primary colors. The number and size of the sensors are selected in accordance with the sensitivity to each of the primary colors of light and the position of each light receiver so that the influence of direction on the detection of light of the primary colors passing through each of the images is reduced. The sensors detect color components of each of the images on the negative film 22, and the detected information is displayed on a display (not shown), or the detected signals are input to an arithmetic and logical unit to thereby generate correction signals.

The inner light receivers 160, 162 are mounted on a light receiver body 168 which is disposed below the lifting plate 102 at a certain spacing therefrom. The light receiver body 168 is secured to the lower end portion of a support shaft 170 which is disposed in such a manner that its axis extends vertically. As clearly shown in FIG. 3, the support shaft 170 extends through the central axis of the lifting plate 102 such as to project beyond the upper surface of the lifting plate 102 and further extends through a bearing 172 which projects from the motor bracket 114. The upper end portion of the support shaft 170 which projects beyond the upper surface of the bearing 172 is formed with an enlarged-diameter portion 174 which abuts against the bearing 172 such as to prevent the light receiver body 168 from coming off downwardly.

Figure 7:
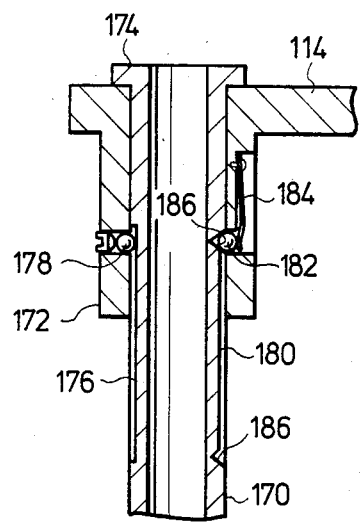
FIG. 7 is an enlarged view of an essential portion of the embodiment shown in FIG. 3.

As shown in FIG. 7 in an enlarged manner, an axial guide groove 176 is formed in a portion of the support shaft 170 in the vicinity of its upper end portion. The guide groove 176 receives one of the sides of a guide ball 178 which has the other side thereof received by the bearing 172. Thus, the support shaft 170 is prevented from rotation about its vertical axis.

Further, an axial guide groove 180 is formed in the support shaft 170 on the side thereof which is opposite to the guide groove 176. Against the guide groove 180 abuts a portion of a guide ball 182 which is retained by the bearing 172. This guide ball 182 is biased by a leaf spring 184 toward the bottom surface of the guide groove 180. The guide ball 182 enters either of click grooves 186 which are respectively defined by portions formed at both end portions of the guide groove 180 by increasing the depth of the groove 180, whereby the height of the support shaft 170 can be maintained when it is at its raised or lowered position. More specifically, as shown in FIG. 7, when the guide ball 182 is disposed in the click groove 186 which is formed at the upper end portion of the guide groove 180, the support shaft 170, together with the inner light receivers 160, 162, is maintained at the lowered position, and at this position, the inner light receivers 160, 162 receive and detect the light from a selected one of the image frames on the negative film 22. On the other hand, when the support shaft 170 is raised in such a manner that the guide ball 182 is received in the click groove 186 which is formed at the lower end portion of the guide groove 180, the inner light receivers 160, 162 are disposed at their raised position at which they are sufficiently separate from the negative film 22, whereby retraction of the negative film carrier 14 is facilitated.

Figure 9:
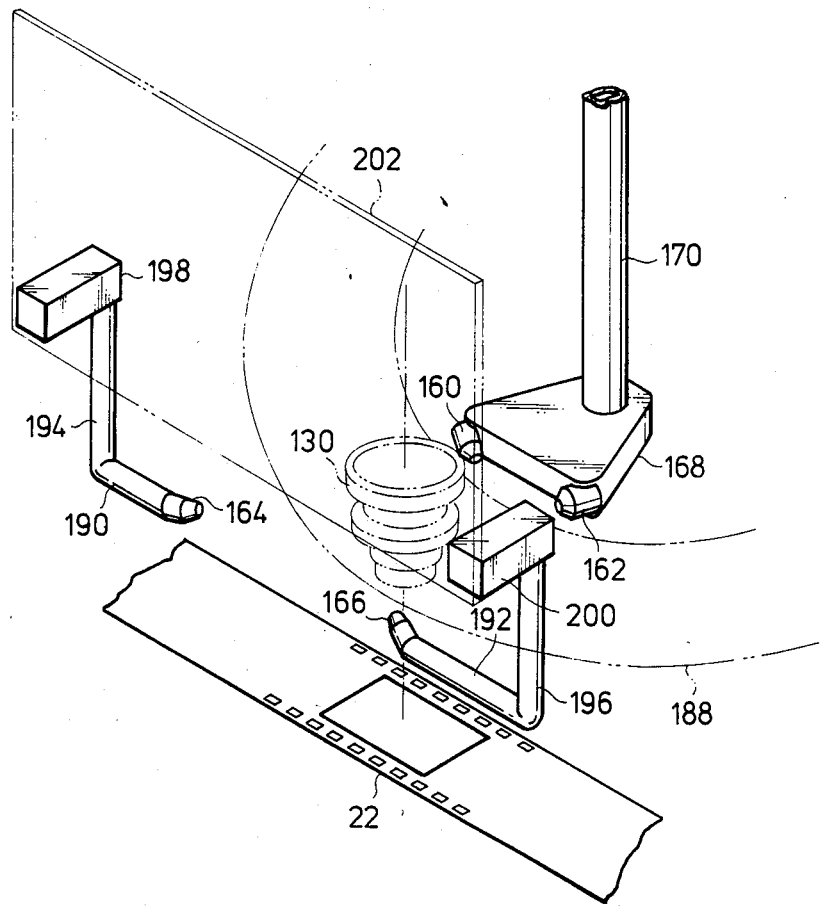
FIG. 9 is a perspective view of the constituent elements shown in FIG. 8.

Since the inner light receivers 160, 162 are thus supported by the support shaft 170 extending through the central axis of the lifting plate 102, when the rotating plate 128 is rotated, the inner light receivers 160, 162 are prevented from interfering with the rotational locus 188 of the optical systems 130 as shown in FIGS. 8 and 9. Further, signals detected by the inner light receivers 160, 161 are transmitted by means of signal lines (not shown) extending through the inside of the support shaft 170.

On the other hand, the outer light receivers 164, 166 are, as shown in FIG. 8, disposed such as to oppose the selected one of the image frames on the negative film 22 in a manner similar to that of the inner light receivers 160, 162. The distance between the outer light receivers 164, 166 is, however, larger than that between the inner light receivers 160, 162. By this arrangement, it becomes extremely easy for an operator to visually monitor the images on the negative film 22 in the direction shown by the arrow B in FIG. 8.

The outer light receivers 164, 166 are respectively secured to the distal ends of support pipes 190, 192 which are respectively disposed on the left and right sides. The other ends of the support pipes 190, 192 are, as shown in FIG. 9, secured to the respective lower end portions of vertical pipes 194, 196. The respective upper end portions of the vertical pipes 194, 196 are secured to the respective rear end portion of blocks 198, 200. On the other hand, the respective front end portions of the blocks 198, 200 are secured to the frame 16 through a mounting plate 202. Thus, the outer light receivers 164, 166 are fixedly suspended from the frame 16. At the same time, the outer light receivers 164, 166 extend into the area below the lifting plate 102 while by-passing the bellows 134 and the lifting plate 102. Moreover, the outer light receivers 164, 166 are disposed outside the rotational locus 188 of the optical systems 130.

The following is a description of the operation of the embodiment arranged as described above.

The negative film 22 of continuous length has been wound on the supply reel 18 beforehand, and the leading end of the negative film 22 is, as shown by the imaginary line in FIG. 1, passed through the negative film carrier 14 and is then wound on the take-up reel 26. When the negative film 22 has full-size images, the printing operation is carried out in a state wherein the carrier body 46 of the negative film carrier 14 is placed in the position illustrated in FIG. 2. In this printing operation, it may be necessary to change the optical systems 130 one with another in accordance with the size of the image to be printed on the photographic paper 132. If one optical system 130 needs to be changed with another, the rotating plate 128 is rotated by the motor 136 until a desired optical system 130 becomes coincident with the printing light axis A. During the rotation of the rotating plate 128 also, there is no interference with the movement of the optical systems 130 since the inner light receivers 160, 162 are disposed inside the rotational locus 188, and the outer light receivers 164, 166 outside the locus 188.

In the printing operation, when it is desired to visually monitor the images on the negative film 22, it is possible for the operator to easily conduct a monitoring operation in the manner shown by the arrow B in FIG. 8 since the outer light receivers 164, 166 are sufficiently separate from each other.

The optical systems 130 are vertically moved by the rotation of the motor 112 if necessary, whereby it is possible to adjust, for example, the focal length.

When the negative film 22 having half-size images is delivered to the printing gate aperture 58 of the negative film carrier 14, the carrier body 46 is rotated 90° counterclockwise as viewed in FIG. 2 by hand or proper detector means. By so doing, the shorter sides of the printing gate aperture 58 respectively become coincident with the longer sides of each of the half-size images, whereby it is possible to effect a printing operation similar to that described above.

When there is a need to print the negative film 22 having special-size images or the negative film 22 which is not of continuous length type, it is necessary to dispose another negative film carrier 14 on the table 12.

In such a case, the wheeled base 44 shown in FIG. 3 is raised such as to separate from the block 62 in the manner shown in FIG. 4 and is then pushed rearwardly. Thereupon, the wheels 50, 54 roll through the respective grooves 56, 57, whereby the negative film carrier 14 is moved to the position shown by the imaginary line in FIG. 3. Accordingly, it becomes possible to dispose another negative film carrier 14 on the table 12 and to carry out a necessary printing operation.

In this case, the light receiver body 168 has been raised beforehand, whereby it is possible to facilitate the retraction of the negative film carrier 14 and the mounting of another negative film carrier 14.

More specifically, as the light receiver body 168 is raised by hand by a predetermined amount, the light receiver body 168 abuts against the rotating plate 128 or the lifting plate 102. As the light receiver body 168 is further raised, the rotating plate 128 and the lifting plate 102 are then raised simultaneously. Accordingly, it is possible for the operator to raise both the light receiver body 168 and the lifting plate 102 simply by raising the light receiver body 168 alone. It is possible to retain the light receiver body 168 and the lifting plate 102 at their raised positions by means of the frictional resistance between the guide ball 182 and the click groove 186 shown in FIG. 7. However, means for maintaining their raised state may be provided separately. Further, the light receiver body 168 may be raised by means of the driving force of, for example, a motor.

After the operation for printing the special negative film has been completed, the negative film carrier for special printing is removed, and the negative film carrier 14 is advanced such as to return to the position shown by the solid line in FIG. 3. Also, the light receiver body 168 and the lifting plate 102 are returned to their former positions, thereby preparing for an operation for printing the ordinary negative film 22.

It is to be noted that, although a combination of the wheels 50, 54 and the grooves 56, 57 has been shown as the means for guiding the retraction of the negative film carrier 14 in the above-described embodiment, other means may be employed to guide the retraction of the negative film carrier 14, such as a linear slide bearing, a link mechanism or a slide rail.

What is claimed is:

1. A photographic printing apparatus which prints the images of a negative film onto photographic paper, comprising;
    (a) a negative film carrier for successively guiding an intermediate portion of a negative film of continuous length on a printing light axis, said negative film carrier being capable of retracting from said printing light axis;
    (b) a light receiver disposed such as to oppose said printing light axis of said negative film carrier;
    (c) an optical system movable onto said printing light axis; and
    (d) lifting guide means which permits said light receiver and said optical system to move in directions in which they come toward and away from said negative film carrier independently of each other and moves both said light receiver and said optical system in a direction in which they separate from said negative film carrier when said negative film carrier is retracted, whereby the retraction of said negative film carrier from said printing light axis is facilitated.

2. A photographic printing apparatus according to claim 1, wherein said negative film carrier includes an aperture on said printing light axis.

3. A photographic printing apparatus according to claim 1, wherein said negative film carrier is retracted from said printing optical axis by means of a combination of a rail and a wheel which rolls on said rail.

4. A photographic printing apparatus according to claim 3, wherein said negative film carrier is mounted on a block when it is at its printing position, whereby said wheel is separated from said rail.

5. A photographic printing apparatus according to claim 4, wherein said negative film carrier is accurately positioned by means of a combination of a pin and a bore for tightly receiving said pin in a state wherein said negative film carrier is mounted on said block.

6. A photographic printing apparatus according to claim 1, wherein said light receiver is mounted on a support shaft which vertically moves while being guided by a bearing mounted on a frame.

7. A photographic printing apparatus according to claim 6, wherein said support shaft has a guide groove formed in the axial direction thereof, and a guide member enters said guide groove, whereby said support shaft is prevented from rotating about its axis.

8. A photographic printing apparatus according to claim 6, wherein said support shaft is provided with means for retaining said light receiver at its raised position.

9. A photographic printing apparatus according to claim 1, wherein said optical system is mounted on a lifting plate which vertically moves along a guide secured to a frame.

10. A photographic printing apparatus according to claim 9, wherein said lifting plate is vertically moved by means of the driving force of a motor to cope with a change in magnification at the time of printing and is vertically moved by hand at the time of retraction of said negative film carrier.

11. A photographic printing apparatus according to claim 9, wherein said optical system is mounted on said lifting plate in the vicinity of the lower end portion of a support shaft which has its intermediate portion extending through said lifting plate and its upper end portion supported by said frame.

12. A photographic printing apparatus according to claim 11, wherein said upper end portion of said support shaft is vertically movably supported by said frame, and said support shaft is disposed such that, when it is raised by a predetermined amount, said light receiver abuts against said lifting plate, whereby said light receiver is raised together with said optical system.

13. A photographic printing apparatus according to claim 12, wherein said support shaft extends through the center of rotation of a rotating plate which is mounted on said lifting plate such as to rotate thereon while supporting said optical system.

14. A photographic printing apparatus which effects printing on photographic paper by successively disposing a negative film of continuous length on a printing light axis as well as being capable of printing other types of film if necessary, comprising:
    (a) a negative film carrier disposed on said printing light axis to guide an intermediate portion of a negative film;
    (b) a guide mechanism for retracting said negative film from said printing light axis;
    (c) a plurality of optical systems;
    (d) a lifting plate having said optical systems mounted thereon such as to successively dispose the same on said printing light axis;
    (e) driving means for vertically moving said lifting plate in accordance with any one of said optical systems to be employed for the purpose of adjustment;
    (f) a light receiver disposed between said lifting plate and said negative film carrier on said printing light axis such as to oppose said printing light axis;
    (g) a support shaft having one of the ends thereof supporting said light receiver and the other end vertically movably mounted on a frame; and
    (h) lifting guide means which permits said lifting plate and said light receiver to move vertically independently of each other and raises both said light receiver and said optical systems at the time of retraction of said negative film carrier, whereby the replacement of said negative film carrier with another is facilitated, and it is possible to print another type of film.

15. A photographic printing apparatus according to claim 14, wherein said light receiver is disposed below said lifting plate, whereby said light receiver is vertically movable independently of said optical systems, and when said light receiver is raised by a predetermined amount, it abuts against said lifting plate and, thereafter, said light receiver is raised together with said lifting plate.

16. A photographic printing apparatus according to claim 14, wherein said support shaft has a guide groove formed in the axial direction thereof, and a guide member enters said guide groove, whereby said support shaft is prevented from rotating about its axis.

17. A photographic printing apparatus according to claim 14, wherein said support shaft is provided with means for retaining said light receiver at its raised position.

18. A photographic printing apparatus according to claim 14, wherein said support shaft extends through the center of rotation of a rotating plate which is mounted on said lifting plate such as to rotate thereon while supporting said optical system.

19. A photographic printing apparatus which matches operations for printing various types of film including a negative film of continuous length, comprising:
   (a) a frame;
   (b) a supply unit rotatably supported by said frame to feed out a negative film of continuous length;
   (c) a negative film carrier for passing said negative film from said supply unit and including a printing gate aperture on a printing light axis;
   (d) a guide mechanism for retracting said negative film carrier from said printing light axis;
   (e) a take-up unit rotatably supported by said frame to wind up said negative film which has been subjected to a printing operation;
   (f) a lifting plate disposed above said negative film carrier which is at its printing position;
   (g) a plurality of optical systems arranged on said lifting plate around the center of rotation thereof and successively disposed on said printing light axis;
   (h) a light receiver disposed between said lifting plate and said negative film carrier at its printing position such as to oppose said printing light axis; and
   (i) a support shaft having its lower end supporting said light receiver, its intermediate portion extending through said lifting plate and its upper end vertically movably supported by said frame, whereby, when said light receiver is raised at the time of retraction of said negative film carrier, said light receiver abuts against said lifting plate and is then raised together with said optical systems, thereby facilitating the replacement of said negative film carrier with another.

20. A photographic printing apparatus according to claim 19, wherein said support shaft is provided with means for retaining said light receiver at its raised position.

21. A photographic printing apparatus according to claim 19, wherein said support shaft extends through the center of rotation of a rotating plate which is mounted on said lifting plate such as to rotate thereon while supporting said optical system.

* * * * *